March 8, 1938.  N. WILKINSON  2,110,142

POWER TRANSMISSION SYSTEM FOR WELL DRILLING AND THE LIKE

Original Filed June 29, 1933

Inventor
N. Wilkinson
by
Attorney

Patented Mar. 8, 1938

2,110,142

UNITED STATES PATENT OFFICE 2,110,142

POWER TRANSMISSION SYSTEM FOR WELL DRILLING AND THE LIKE

Nathan Wilkinson, Wauwatosa, Wis., assignor to Allis-Chalmers Manufacturing Company, Milwaukee, Wis., a corporation of Delaware Original application June 29, 1933, Serial No. 678,235. Divided and this application March 9, 1935, Serial No. 10,155

23 Claims. (Cl. 172—239)

This invention relates to power transmission systems and control therefor, and the system is of particularly advantageous use in connection with the several operations required in an oil well drilling rig, such as the operations of rotating and hoisting a rotary drill and the pumping of mud laden fluid for circulation in the drill hole during the operation of the drill.

The present application is a continuation in part of applicant's copending application Serial No. 512,899, filed February 2, 1931, patented March 12, 1935, No. 1,994,376, and it is a division of applicant's copending application Serial No. 678,235, filed June 29, 1933, patented January 7, 1936, No. 2,026,600.

In a system of this general character involving a plurality of different operations which are preferably performed under different speed and torque conditions, it is desirable to utilize electrical motors as the several work motors and to supply the same from separate sources of supply, such as electrical generators, each of which may be operated at an economical speed, and the speed of the several motors may be controlled by varying the voltage of the generators supplying the particular motors. It is also desirable, in the interest of flexibility and power economy and assurance against shutdown of essential operations, to have the generators supplying the several motors capable of being driven from different prime movers or sources of power, and to provide facilities for connecting several of the generators to supply one or more of the motors when the power requirements of the motor or the operating economy of the system are such as will be best served through such connections.

A further object is the provision of an electric power transmission system in which engines, such as internal combustion engines, are used as prime movers, and further, in which close regulation of the speed of the engines is not essential. A more specific object is the provision of such a system in which two engines are used each one automatically carrying its proportion of the total load.

A further object is the provision of an improved power transmission system in which a plurality of prime movers are capable of driving a plurality of generators which in turn are capable of supplying energy to a plurality of electric motors, and wherein provisions are available for supplying each of several motors from its own individual generator independently of whether a single one or a plurality of the prime movers are in operation.

In connection with well drilling apparatus of the type in which water or mud is pumped into the drill hole, it is an object to provide a system of power transmission in which either the pump motor or the drill motor may be started, stopped and otherwise controlled, without affecting the other motor.

Still another object is the provision of a power transmission system which when used in connection with well drilling operations will permit all of the drilling and pumping operations and all of the ordinary and usual hoisting operations to be performed under economical conditions with either one prime mover in operation, or more than one.

Still another object is the provision of a system useful in well drilling operations and in which one or more of a plurality of electric motors are used to selectively drive the hoisting, pumping, and drilling mechanism, the energy for the motors being selectively furnished by one or more of a plurality of engine driven generators which may be of the same capacities.

A further object of the invention is the provision of a system useful in well drilling operations and wherein one or more of a plurality of electric motors are used to selectively drive the hoisting, pumping, and drilling mechanism, the energy for the motors being supplied during certain operations from all of a plurality of engine driven generators which are connected in series-parallel and supplied during other operations from parallel connected pairs of the generators.

A further object is to provide a well drilling system of the above character with a plurality of engine driven generators each having a rheostat for controlling the excitation of the field winding thereof, and more specifically the provision of devices for rendering all of said rheostats simultaneously operable during certain operations and for rendering said rheostats operable in pairs during other operations.

Other objects will appear hereinafter as the description of the invention proceeds.

Various novel features of the invention will appear from this specification and the accompanying drawing showing an embodiment of the invention and all of these features are intended to be more particularly pointed out in the claims.

Figure 1:
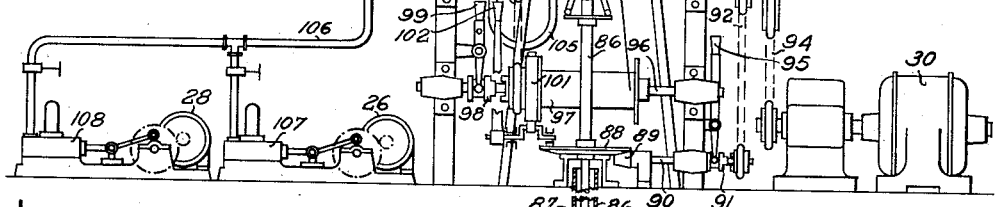
Figure 1 is a diagrammatic showing of an embodiment of the invention with particular relation to the electrical control features thereof.
Figure 1:
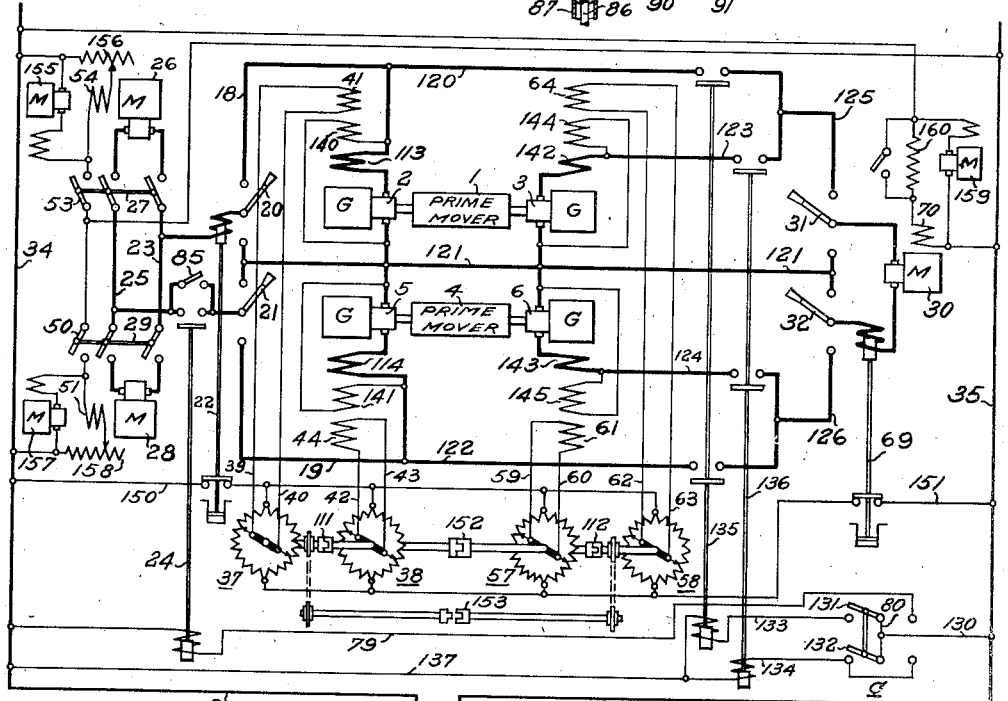
Figure 1:
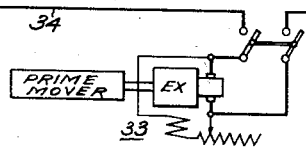

Figures 3 to 7 inclusive are diagrammatic showings of various electrical power connections which may be obtained with the system shown in Figure 1.

Referring to Figure 1 of the drawing, a prime mover 1 is arranged to drive a pair of generators 2 and 3 which are diagrammatically indicated as of equal capacity, and another prime mover 4 is arranged to drive a pair of generators 5 and 6 which are diagrammatically indicated as of equal capacity, the four generators (2, 3, 5, and 6) being contemplated in the embodiment of the invention specifically disclosed, as being of substantially the same rating or capacity. Generators 2 and 5 are shown connected in series noting that the outer terminals of these generators are connected to conductors 120 and 122 and that the intermediate terminals are connected to common conductor 121. Generators 3 and 6 are shown connected in series, noting that the outer terminals of these generators are connected to conductors 123 and 124 and that the intermediate terminals are connected to common conductor 121. Generators 2 and 5 are provided with series differential field windings 113 and 114 and separately excited field windings 41 and 44, respectively. Generators 3 and 6 are provided with differential series field windings 142 and 143 and separately excited field windings 64 and 61, respectively. The generators 2, 3 may, if desired, also be provided with self excited shunt windings 140, 144, respectively, and the generators 5, 6 may also be provided with corresponding windings 141, 145, respectively. The separately excited field windings and the self excited field windings are normally cumulative. The self excited winding of each generator is preferably so proportioned that its ampere turns are always less than the air-gap ampere turns, that is, the resistance of this winding is such that the plotted curve (current in self excited winding as abscissa and terminal voltage as ordinate) never intersects the voltage characteristic curve of the generator. The polarity and magnitude of generator voltages are therefore determined by the separately excited windings. The main purpose of the series differential field windings and the self excited field windings, where provided, is to accentuate the drooping characteristic of the generators so as to prevent or inhibit stalling of a prime mover in event one prime mover is temporarily unable to develop as much torque as the other prime mover. The effect of preventing stalling of an imperfectly operating prime mover is augmented by the automatic weakening of the self excited field windings of the generators connected thereto upon occurrence of the reduction in speed of the faulty prime mover. Electromagnetic contactors 135 and 136 are provided to connect series connected generators 2 and 5 in parallel with series connected generators 3 and 6.

Pump motors 26 and 28 may be selectively connected to load conductors 23, 25 by means of switches 27 and 29, respectively. An electromagnetic contactor 24 is operable to connect load conductor 25 with the blade of switch 21, noting that load conductor 23 is permanently connected to the blade of switch 20 through the coil of overload relay 22. By means of hand operated switches 20 and 21, the load conductors 23 and 25 may be selectively connected either to conductors 18 and 121, or conductors 19 and 122, or to conductors 18 and 19.

The drilling or hoisting motor 30 may be selectively connected to conductors 125 and 121, or 126 and 121, or to conductors 125 and 126 by means of hand operated switches 31 and 32.

Separately excited field windings 41, 44, 64, and 61 are controlled by rheostats 37, 38, 58, and 57, respectively. These rheostats are all energized from bus 34, 35 through conductors 150 and 151 when overload relays 22 and 69 are in their normally closed positions. An overload on either motor 30 or the pumping motors 26 or 28 will cause the respective overload relays 69 or 22 to operate to deenergize all of the separately excited generator field windings. Rheostats 37 and 38 are mechanically connected together by releasable clutch 111 and rheostats 57 and 58 are mechanically connected together by releasable clutch 112. An additional releasable clutch 152 is arranged between rheostats 38 and 57 so that all four rheostats may be simultaneously operated or, if clutches 111 and 112 are disconnected, so that rheostats 38 and 57 may be operated simultaneously. An additional releasable clutch 153 is arranged between rheostats 37 and 58, so that with clutches 111 and 112 disconnected, rheostats 37 and 58 may be simultaneously operated. The utility of this arrangement will be better understood in connection with the description of the operation of the generators during certain operations.

Master controller C is a double pole, double throw switch having blades 131 and 132. When these blades are thrown to their left hand position, a circuit is established from bus 35 through conductor 130, conductor 80, blade 131, conductor 133, operating coil of contactor 135, through conductor 137 to bus 34, thereby causing contactor 135 to close. Another circuit is also established from bus 35 through conductor 130, conductor 80, switch-blade 132, conductor 134, operating coil of contactor 136, and through conductor 137 to bus 34. The closure of contactors 135 and 136 connects the generators in series-parallel. When the blades of the master controller C are moved to their right hand position, a control circuit is established from bus 35 through conductor 130, conductor 80, switch blade 131, conductor 79, the operating coil of contactor 24 to bus 34 thereby causing contactor 24 to close. Another circuit is also established from bus 35 through conductor 130, conductor 80, switch blade 132, conductor 134, operating coil of contactor 136, through conductor 137 to bus 34. The closure of contactors 136 and 24 connects generators 2, 5 and 3, 6 to motor 26 (or 28) and motor 30, respectively.

Inasmuch as motors 26, 28, and 30, where the system is used for operating an oil well drilling rig, are used in close proximity to explosive gases it is desirable that these motors be totally enclosed, and for this reason each of these motors is provided with a forced draft ventilating system. For example, motor 26 is provided with a blower motor 155 which is connected across the field winding 54 and field control rheostat 156. Pump motor 28 is provided with a blower motor 157 which is connected across field winding 51 and field control rheostat 158. Motor 30 is provided with a blower motor 159 which is connected across field winding 78. It is to be noted that by connecting these ventilating motors across the respective field windings of the motors to be cooled that considerable saving is obtained in the number of conductors necessary.

For a purpose which will appear in connection with the description of the operation of the system, a switch 85 is provided for bypassing the contactor 24. The switch is, under the usual operating conditions, open.

Figure 2:
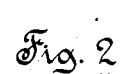
Figure 2 is a more or less diagrammatic elevation of mechanical features of one type of oil well drilling rig in connection with which the invention may be used.

Referring now to Fig. 2, this shows in more or less diagrammatic form an oil well drilling rig of the rotary type with which the invention may be utilized. It is to be understood that the particular form of mechanical drilling rig is shown only by way of illustration so that one way in which applicant's invention may be utilized may be better understood. The drilling rig here shown comprises a hollow drill 86 around which is disposed a casing 87 which is sunk around the drill as the drilling proceeds. The drill 86 may be rotated in any suitable manner by means of a gear 88 driven by a bevel pinion 89 from a shaft 90. The shaft 90 may be connected to a driving chain 92 by means of a clutch 91 operable by a lever 95. The driving chain 92 is in operative relation to a shaft 93 which is in turn driven by a driving chain 94 from the motor 30 which corresponds to the motor 30 in Fig. 1. A shaft is provided which carries fast thereon a winding drum 97. The shaft 96 may be connected to a driving chain 100 by means of a clutch 98 operable by a clutch lever 99. A brake 101 is provided for the drum 97, which brake is operable by means of a brake lever 102.

The winding drum 97 is adapted to receive a cable 103 which runs to the top of a derrick 104 and is passed over suitable pulley blocks or sheaves at the top of the derrick and also over a sheave operatively related to the drill rod 86, so that the winding drum 97 may be used to hoist and lower the drill rod 86, or other desired parts. The drill rod is here shown as connected by means of a flexible hose 105 to a pipe 106, in turn connected to a pair of pumps 107, 108 of any suitable form. The pumps are here shown as driven respectively by the motors 26, 28 which correspond to those of the same number in Fig. 1.

The operation of the system will be best understood by a consideration of the various mechanical set-ups and electrical circuits that may be secured with the system hereinbefore described.

Figure 3:
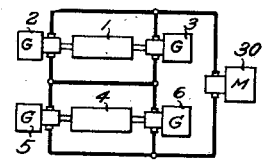

If it is desired to hoist the drill rod 86 or any other part attached to the hoisting cable 103, at full speed, the field rheostats should be moved to such a position that the clutches 111, 112 and 152 may be moved to their engaging positions. With the rheostats all simultaneously operable the voltages of the generators will be substantially equal which is a prerequisite to the operation of these generators in parallel. The switch 31 is moved to its upper position and the switch 32 is moved to its lower position thereby connecting motor 30 to conductors 125 and 126. The master controller C may then be moved to its left-hand position thereby connecting generators 2, 3, 5, and 6 in series-parallel as schematically shown in Figure 3. The field rheostats 37, 38, 57, and 58, are then moved in one direction or the other from their natural position to simultaneously raise the voltage of all generators and thereby cause motor 30 to start and run in one direction or the other.

With the hoisting set-up shown in Figure 3 above described, the motor 30 may be of 400 H. P. rating operating at 1,000 R. P. M. at 350 volts with a peak load capacity of 600 H. P. noting that since each generator may, for example, be of 150 k. w. rating that 600 k. w. will be available for hoisting. The ratings of the generators and motors are merely cited to more clearly set forth the utility of the invention and are not intended to be taken in a limiting sense.

Figure 4:
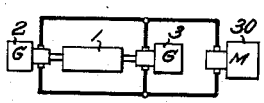

If a break down occurs on either one of the prime mover units, hoisting at half speed may be obtained by connecting motor 30 to the parallel connected generators of the remaining unit by means of switches 31 and 32 as schematically shown in Figure 4, noting that with this connection, 300 k. w. of generating capacity will be available for operating motor 30 at about half speed.

Figure 5:
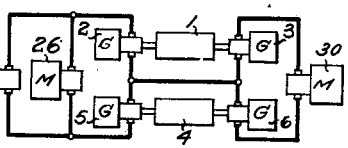

If it is desired to rotate the drill 86 and pump liquid down through the drill at the same time, the clutch 98 of Figure 2 is disengaged and the clutch 91 is engaged so as to connect the driving shaft 90 to the shaft 93 for rotating the drill. The switch 31 is moved to its upper position and the switch 32 is moved to its lower position. If it is desired to use both pumps 107 and 108, both switches 27 and 29 are closed thereby connecting motors 26 and 28 to the load conductors 23 and 25, it being noted, however, that adequate pumping capacity may be obtained by using either one of the pumping units; however, in some instances it is desirable to operate the other pumping unit at reduced output to mix the liquid which is pumped into the casing of the well. Switches 20 and 21 are also moved to their upper and lower positions, respectively, to connect generators 2 and 5 to one or both of the pumping motors 26 and 28. The master switch C is moved to its right hand position, thereby energizing the operating coils of contactors 136 and 24, noting that, since contactor 135 is not energized in this position, generators 2 and 5 will not be connected in parallel with generators 3 and 6. The circuit connections for obtaining the above described set-up are schematically shown in Figure 5. Inasmuch as generators 2 and 5 are not electrically connected with generators 3 and 6 it is desirable that field rheostats 37 and 38 be connected together by means of clutch 111 and that rheostats 57 and 58 be connected together by clutch 112, noting that for this set-up the clutches 152 and 153 should be disengaged so that the above described pairs of rheostats may be independently operable to vary the speed of the pumping motors or the speed of the drilling motor 30 independently.

It will be evident that with the set-up of Figure 5 the motor 30 may be operated at full speed for the drilling operation (which usually requires only about 100 H. P.), and since motor 30 is fed from generators 3 and 6 in series, it is evident that one pumping unit may be operated also at full speed noting that if the other pumping unit is also used at the same time for mixing liquid, it needs only to operate at a fraction of its rated capacity. For the above described drilling and pumping operation, the engines 1 and 4 may have their governors set to operate at say 850 R. P. M. If necessary, the full rated capacity of generator 3 and 6, namely, 300 k. w., may be used to energize motor 30 for drilling operations, yet such is rarely necessary. It will be obvious that the power output of the generators in the above example may be widely varied to meet the requirements of the conditions by adjustment of the rheostats 37, 38 and 57, 58.

Figure 6:
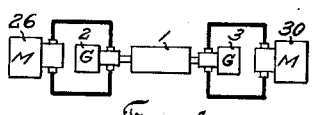

If a break down occurs on one of the prime mover units, the drilling and pumping operations may be continued at half speed, using the other prime mover unit as shown in Figure 6. The position of the clutches 91 and 98 will be the same as described in connection with Figure 5. Switches 31 and 32 are moved to connect motor 30 across the operative generator, whether it be 3 or 6. Likewise, switches 20 and 21 are moved to connect the pump motor or pump motors across the generator which remains operative, whether it be 2 or 5. The master switch remains in its right hand position as described in connection with the set-up of Figure 5. All of the rheostat clutches (111, 112, 152, and 153) are moved to disengaged position so that only the rheostats associated with the operative generators may be moved from their neutral positions to separately control the voltage of the respective generators. It will thus be seen that 150 k. w. will be available for pumping and that 150 k. w. will be also available for drilling at slightly less than full speed by weakening the field of motor 30 by means of normally shunted resistor 160.

Figure 7:
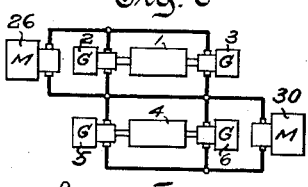

It sometimes occurs that it is desirable to hoist and pump at the same time, noting that this condition is generally known as the "fishing" set-up. Referring now to Figure 7, with this set-up, hoisting operations may be performed, as in case a drill rod should break, and at the same time one of the pumps may be used. This "fishing" set-up may be secured with a pump motor fed from generators 2 and 3 in parallel and the motor 30 fed from generators 5 and 6 in parallel, or vice versa. Obviously, the fishing operation may be conducted with the set-up shown in Fig. 5, if desired. The operations for securing the set-ups shown in Fig. 7 will first be described. The clutch 98 is engaged, and if it is desired to hoist only, the clutch 91 is disengaged. The switches 31 and 32 are both moved to their lower position and switches 20 and 21 are both moved to their upper positions. The master switch is moved to its left hand position thereby causing closure of contactors 135 and 136. If it is desired to operate either one or both of pump motors 26 and 28, it is necessary to manually close switch 85 and one or both of switches 27 or 29. If for any reason it is desirable to rotate the drill as it is being hoisted or lowered with, for example, the "fishing" set-up of Figure 7, the clutch 91 may be moved into engagement.

It will be evident from the description of the various set-ups that, if desired, only one engine and one set of generators need be used for the first few thousand feet of drilling (the set being say as in Fig. 6) and that subsequently, or at any desired time, more than one engine and set of generators may be used for drilling (the set-up being say as in Fig. 5). It is of course obvious that the same applies at any stage of the drilling, since, if one engine fails, operations may be carried on with the other engine but with the driving motors operating at half speed. Full torque is however available whether the motors are running at full speed or half speed. Moreover to secure this full torque under either condition of operation, it is unnecessary to alter the driving or gear ratio as between the driving motors and the mechanical drill rigging.

What has been stated above also applies with regard to the full speed and half speed hoisting set-ups of Figs. 3 and 4, respectively.

The exciter 33 being separately driven by an auxiliary engine (not shown) makes possible the use of said exciter for various purposes, such as for lighting the drill site, without necessity of having the main engines 1, 4, running, or even before said main engines are available at all, as while the drilling rig and drive are being erected.

It will be apparent that with the system and control apparatus therefor disclosed herein, a high degree of reliability and flexibility is provided in the operation of the system, insuring that the several independent desired operations may be proceeded with in an economical manner, even though any one of the prime movers should be out of commission; and under all of these conditions, the several motors are independently controllable through their supply generator or generators.

It should be understood that it is not desired to limit the invention to the exact details of construction shown and described for obvious modifications may occur to persons skilled in the art.

It is claimed and desired to secure by Letters Patent:

1. In a power transmission system, two pairs of generators, a pair of prime movers each arranged to drive one generator of each of said pairs of generators, a motor, means for connecting one of said pairs of generators in series to said motor and for causing operation thereof at a speed independent of the speed of operation of said prime movers or for connecting the generators of said other pair in series to said motor and for causing operation of the latter at a speed independent of the speed of operation of said prime movers.

2. In combination, a pair of generators, a pair of conductors, a motor, means for connecting said motor to said conductors, an electromagnetically operable contactor for connecting a terminal of one of said generators to one of said conductors, a second electromagnetically operable contactor for connecting a terminal of the other of said generators to said one of said conductors, means whereby the other terminals of said generators may be connected together, means for connecting said other of said conductors with said other terminals of said generators, a second motor, means including an electromagnetically operable contactor for connecting said second motor to one of said generators, and means including a control switch having one position in which the operating winding of said last named contactor and the operating winding of one of the two first named contactors is energized and another position in which only the operating winding of the other of said first two named contactors is energized.

3. In combination, a pair of generators connectible in series, a second pair of generators connectible in series, each pair of generators being provided with a neutral and two outside terminals, three conductors corresponding respectively to said terminals, a motor, means whereby said motor may be selectively connected to any pair of said three conductors, and means for selectively connecting said three conductors to the outside and neutral terminals respectively of either of said pairs of generators.

4. In combination, a pair of generators connectible in series, a second pair of generators connectible in series, each pair of generators being provided with a neutral and two outside terminals, three conductors corresponding respectively to said terminals, a motor, means whereby said motor may be connected to any pair of said three conductors, means for selectively connecting said three conductors to the outside and neutral terminals respectively of either one or the other of said pairs of generators, a second motor, and means for selectively connecting said second motor to any pair of the terminals of said first named pair of generators.

5. In combination, a pair of generators connectible in series, a second pair of generators connectible in series, each pair of generators being provided with a neutral and two outside terminals, three conductors corresponding respectively to said terminals, switching means for selectively connecting said three conductors to the terminals of one pair of said generators or to the terminals of the other pair of said generators, a motor, a pair of switches independently operable to selectively connect said motor to any pair of said three conductors, a second motor, a second pair of switches independently operable to selectively connect said second motor to any pair of the terminals of said first mentioned pair of generators.

6. A power transmission system, comprising an electric motor, a second electric motor, each of said motors having a separately excited field winding, motor driven ventilating fans arranged to circulate air through said motors, the motors of said blowers being connected across said separately excited field windings respectively, a pair of generators, means for driving said generators, and means operable to selectively connect said main motors to said generators respectively and to render said main motors operative at speeds independent of the speed of operation of said generators.

7. In combination, a pair of generators connectible in series, a second pair of generators connectible in series, a pair of independent internal combustion engines, each of said engines being arranged to drive one of the generators of each of said pairs of generators, each of said generators having a separately excited field winding, a pair of motors, means including conductors and selectively operable to connect one of said motors across either one or both of said generators of one of said pairs and to selectively connect the other of said motors across either one or both of said generators of the other of said pairs, and an exciter arranged to supply excitation to said field windings.

8. In combination, a pair of generators connectible in series, a second pair of generators connectible in series, a pair of prime movers, each of said prime movers driving a generator of each of said pairs, a motor, and means for selectively establishing connections for energizing said motor from one or both of said generators of said first pair or from one or both of said generators of said other pair, said means comprising manually operable switches for partially and selectively establishing said connections and electromagnetically operated contactors for completing the desired circuits through the selected connections.

9. A power transmission system, comprising a motor, a second motor, a pair of generators connectible in series, another pair of generators connectible in series, two engines each serving as a common driving means for a generator of each of said pairs, and means selectively operable to either connect both pairs of said generators in series-parallel to said second motor or to connect the generators of one of said pairs in series to said first motor and to connect the generators of said another pair in series to said second motor and to provide for the operation of either motor at different speeds independent of the speed of operation of said engines.

10. A power transmission system, comprising an electric motor, a pair of generators connectible in series, another pair of generators connectible in series, a pair of prime movers each arranged to drive one of said first mentioned generators and one of said last mentioned generators, and means selectively operable to connect both pairs of said generators in series-parallel to said motor or to connect the generators driven by either one of said prime movers in parallel to said motor and to render said motor operative at different speeds independent of the speed of operation of said prime movers.

11. A power transmission system, comprising a motor, a pair of generators connectible in series, another pair of generators connectible in series, said generators having their main field windings excited from a separate source of energy, a pair of independent internal combustion engines each arranged to drive one of said first mentioned generators and one of said second mentioned generators, and means including selectively operable switches for connecting the respective generators driven by each of said engines in parallel and said two pairs of generators in series-parallel and to connect said motor to the aforesaid parallel and series-parallel connected generators and for connecting either one or both of the generators of one of said pairs to said motor, and for rendering said motor operative at speeds independent of the speed of operation of said engines.

12. A power transmission system, comprising an electric motor, a second motor, a pair of generators connectible in series, a second pair of generators connectible in series, each of said generators having a separately excited field winding and individual rheostats arranged to control the excitation of said windings, prime movers arranged to drive said generators, switching means including conductors and operable to selectively connect said pairs of generators in series-parallel to one of said motors or to connect two of said generators to one of said motors and the other two generators to the other of said motors, and means for either connecting all of said rheostats together so as to be operable simultaneously while said switching means connects all said generators in series-parallel or connecting said rheostats in pairs so that each pair is operable simultaneously and independently while said switching means connects two of said generators to said first motor and connects the other two of said generators to said second motor, said motors being operative at speeds independent of the speed of operation of said prime movers through suitable adjustment of said individual rheostats.

13. A power transmission system, comprising an electric motor, a second motor, a pair of generators connectible in series, a second pair of generators connectible in series, each of said generators having a separately excited field winding and individual rheostats arranged to control the excitation of said windings, prime movers arranged to drive said generators, means operable to selectively connect said pairs of generators in series-parallel to said first mentioned motor or to connect two of said generators in parallel to said second motor and to connect the other two of said generators in parallel to said first motor, and means for either connecting all of said rheostats together so as to be operable simultaneously while said first means connects all said generators in series-parallel or connecting said rheostats in pairs so that each pair is operable simultaneously and independently while said first means connects two of said generators in parallel to said first motor and connects the other two of said generators in parallel to said second motor, said motors being operative at speeds independent of the speed of operation of said prime movers through suitable adjustment of said individual rheostats.

14. A power transmission system, comprising a motor, a plurality of engines, means for converting the power of said engines and utilizing the converted power for driving said motor, said converting means comprising a pair of electrical generators arranged in driven relation to each of said engines, means for connecting one or both of the generators driven by each engine or a generator driven by one engine connected to a generator driven by another engine in power supplying relation to said motor, and control means for providing variation in the speed of operation of said motor independently of the speed of said engines through adjustment either individually or collectively of the voltages of a plurality of said generators connected in supply relation to said motor.

15. A power transmission system, comprising a pair of generators, a prime mover for driving said generators, a motor, a second motor, a second pair of generators of substantially the same capacities as the generators of said first pair, a prime mover for driving said second pair of generators, a source of separate field excitation for said generators, means for connecting said first motor to either or both of the generators of one of said pairs and for causing operation of said first motor at a speed independent of the speed of operation of said prime movers, and means for connecting either said first motor or said second motor to either or both of the generators of said other pair and for causing operation of said second motor at a speed independent of the speed of operation of said prime movers.

16. A power transmission system, comprising an electric motor, a second electric motor, a plurality of generators, a plurality of prime movers, means operable to connect one of said generators to supply energy to said first mentioned motor and to connect another of said generators to supply energy to said second mentioned motor, and means for insuring selectively that one prime mover may drive one of said generators to supply energy to one of said motors and another of said prime movers may drive another of said generators to supply energy to the other of said motors, or that one prime mover may simultaneously drive one generator to supply one of said motors and another generator to supply said other motor, and means operative to control the energy supplied by said generators to said motors to insure operation of said motors at speeds independent of the speed of operation of said prime movers.

17. A power transmission system, comprising a plurality of prime movers, means for converting the power of said prime movers and utilizing the converted power, said converting means comprising a plurality of separately excited electrical generators arranged to be driven by said prime movers, an electrical motor, a second electrical motor, and means for providing selectively for the operation of said first motor through energy supplied by a plurality of said generators driven selectively by one or by a plurality of said prime movers or the operation of each of said motors through energy supplied by an individual generator while both said generators are driven by either one of said prime movers, and for varying the speed of operation of each said motor independent of the speed of the other said motor and the speed of the prime mover or prime movers driving the generator or generators supplying energy to said motor.

18. A power transmission system, comprising a motor, a second motor, a pair of generators connectible in series, another pair of generators connectible in series, a pair of independent internal combustion engines each arranged to drive one of said first mentioned pair of generators and one of said second mentioned pair of generators, and means including selectively operable switches for connecting the respective generators driven by each of said engines in series-parallel and to connect said first motor to the aforesaid series-parallel connected generators and for connecting either generator of one of said pairs of generators to said first motor and either generator of the other pair of generators to said second motor to thereby insure operation of both of said motors supplied by the generators driven by either engine, and means for rendering said motors operative at different speeds independent of the speed of operation of said engines.

19. A power transmission system, comprising a plurality of electric motors, a plurality of electric generators, a plurality of prime movers, and means for providing selectively for operation of one of said motors through energy supplied by one or by a plurality of said generators with the latter driven selectively by one or by a plurality of said prime movers, or for operation of a plurality of said motors simultaneously each through energy supplied by individual ones of said generators and with each of said generators driven by an individual one of said prime movers, and means for varying the speed of operation of said motors independently of the speed of the generator or generators supplying said motors and the prime mover or prime movers driving said generator or generators.

20. A power transmission system, comprising a source of mechanical power including a plurality of prime movers, means for converting the power of said prime movers and utilizing the converted power, said converting means comprising a plurality of electrical generators, and a plurality of electrical motors connectible to said generators, means for providing for operation of one of said motors through energy supplied selectively by one or by a plurality of said generators driven selectively by one or by a plurality of said prime movers, and means for varying the speed of operation of said motors independently of the speed of operation of a generator supplying the same and a prime mover driving said generator.

21. A power transmission system, comprising a plurality of prime movers, a plurality of electric generators, a pair of electrical motors connectible to said generators, means for providing selectively for operation of either one of said motors alone by energy supplied selectively by a single one of said generators driven by a single one of said prime movers or by a plurality of the generators driven selectively by a single one or by a plurality of said prime movers or operation of both of said motors simultaneously by energy supplied selectively by a plurality of the generators driven by a single prime mover or by a plurality of generators driven by a plurality of said prime movers, and means for varying the speed of operation of said motors independently of the speed of operation of the prime mover or prime movers driving the generator or generators supplying the energy to said motor or motors.

22. A power transmission system comprising a pair of prime movers, a plurality of electric generators, an electrical motor connectible to said generators, means for providing for operation of said motor through energy supplied selectively by a single one of said generators driven by a single prime mover or by a plurality of the generators driven selectively by a single one or by both of said prime movers for varying the speed of operation of said motor independently of the speed of operation of the prime mover or prime movers driving the generator or generators supplying energy to said motor.

23. A power transmission system, comprising a plurality of prime movers, a plurality of electric generators, a pair of electric motors connectible to said generators, means for providing selectively for operation of both of said motors simultaneously each through energy supplied by an individual generator with one said generator driven by one prime mover and another said generator driven by a second prime mover or for operation of one of said motors through energy supplied selectively by a plurality of said generators driven by a single one of said prime movers or by a plurality of the generators driven by a plurality of the prime movers, and means for varying the speed of operation of said motors independently of the speed of operation of the prime mover or prime movers driving the generator or generators supplying energy to said motor or motors.

NATHAN WILKINSON.